United States Patent [19]
DiVita et al.

[11] 4,094,578
[45] June 13, 1978

[54] OPTICAL EQUALIZER FOR SIGNAL-TRANSMISSION SYSTEM USING MULTIMODE LIGHT GUIDES

[75] Inventors: Pietro DiVita, Turin; Riccardo Vannucci, Rome, both of Italy

[73] Assignee: CSELT - Centro Studi e Laboratori Telecomunicazioni S.P.A., Turin, Italy

[21] Appl. No.: 770,232

[22] Filed: Feb. 18, 1977

[30] Foreign Application Priority Data

Feb. 19, 1976    Italy .................. 67380 A/76

[51] Int. Cl.² ................................................. G02B 5/14
[52] U.S. Cl. .................................. 350/96.15; 350/294 350/294
[58] Field of Search ............. 350/96 C, 96 WG, 293, 350/294, 169; 250/209, 227

[56] References Cited

U.S. PATENT DOCUMENTS

| | | | |
|---|---|---|---|
| 3,090,931 | 5/1963 | Marcatili | 350/96 WG X |
| 3,759,590 | 9/1973 | Arnaud | 350/96 WG |
| 3,832,030 | 8/1974 | Gloge | 350/96 WG |
| 3,988,614 | 10/1976 | Kapron et al. | 350/96 WG X |

OTHER PUBLICATIONS

A. D. Beach, "A Simple Devicer for Efficient Coupling ...." Journal of Physics E, vol. 8, No. 9, pp. 745–747, Sep. 1975.

*Primary Examiner*—John K. Corbin
*Assistant Examiner*—Rolf Hille
*Attorney, Agent, or Firm*—Karl F. Ross

[57] ABSTRACT

Signals, especially short pulses, are transmitted by way of a series of light guides with internally reflecting boundaries (i.e. fibers or foils) angularly adjoining one another, each junction being encased in an external body having the same index of refraction as the light guides. Within the body the light rays exiting from one guide are intercepted by one or two mirrors reflecting them to the other guide, each mirror having a cross-section in the form of a segment of an ellipse whose foci are the center points of the two guide ends in a common axial plane of the guides. Each segment terminates in two points represented by the intersection of a respective guide axis with the path of a limiting ray from the other guide.

5 Claims, 6 Drawing Figures

OPTICAL EQUALIZER FOR SIGNAL-TRANSMISSION SYSTEM USING MULTIMODE LIGHT GUIDES

FIELD OF THE INVENTION

Our present invention relates to an optical equalizer for a system in which signals, especially binary ones represented by short spikes (so-called Dirac pulses), are transmitted with the aid of multimode light guides.

BACKGROUND OF THE INVENTION

A light guide as herein contemplated may be either a single optical fiber, a group of optical fibers arrayed in a flat bundle or ribbon, or a light-conducting foil. In each instance the light guide has internally reflecting boundaries with a critical angle of reflection determined by the difference between the refractive indices of the guide substance and the surrounding medium. As is well known, light rays striking the guide boundary at a glancing angle, not exceeding the critical value, are totally reflected and thus do not leave the confines of the guide. In traveling along their transmission path, they bounce back and forth between opposite guide surfaces and eventually leave the exit end of the guide at an inclination to its axis which depends upon the angle of incidence.

Theoretically, at least, a ray may pass along the axis of a straight guide without internal reflection. Such a ray has the shortest transit time through the guide in comparison with rays undergoing reflection, the longest time being that of a ray exiting from the guide surface at the critical or guidance angle. These relative delays of light rays originating at a common modulated source result at the receiving end in a broadening of the pulses and thus in a distortion of the signal. That distortion, of course, increases with the length of the transmission path.

A variety of equalizers have already been suggested for dealing with this problem. One such equalizer, described by D. C. Gloge in an article entitled "Fiber-Delay Equalization by Carrier Drift in the Detector", *Optoelectronics*, vol. 5, 1973, pages 345 – 350, operates electronically on the electric pulses derived from the luminous signal at the receiving end; the light rays emerging at different angles from the exit end of an optical fiber are electronically detected in separate zones working into delay lines which introduce compensatory differences in transit time. Such a system, requiring active electronic components, is relatively complex and limited to specific radiation receivers.

Other solutions, such as those suggested in U.S. Pat. Nos. 3,759,590 and 3,832,030, provide optical equalizers with refractive cones or lenses serving for a compensatory refraction of light rays incident at different angles; these refractive elements must be inserted at intermediate points of the signal path and their presence entails an unavoidable loss of luminous energy. Because of their rigid structure, they introduce an invariable corrective factor of 4 representing the reciprocal of the ratio between the widths of a corrected light pulse in the output of the equalizer and an incident light pulse in its input.

OBJECTS OF THE INVENTION

The general object of our present invention is to provide an improved optical equalizer for the purpose described in which this corrective factor can be significantly increased, e.g. up to a value of about 50.

Another object is to minimize the loss of luminous energy in such an equalizer.

A further object is to provide an optical equalizer of this character which is of simple construction and can be adapted to various requirements.

SUMMARY OF THE INVENTION

In accordance with our present invention, a first and a second light guide extending in cascade between a transmitter and a receiver of luminous signals have proximal ends respectively emitting and collecting bundles of light rays whose axes angularly intersect in a common plane, each of these bundles being bounded by a pair of limiting rays on opposite sides of its axis with which these rays include the aforedescribed critical angle. The rays exiting from the first light guide are intercepted by one or two mirrors reflecting them to the second light guide, the cross-section of each mirror in the common axial plane having the shape of a segment or an ellipse whose foci are the center points of the two proximal guide ends within that plane; each reflecting segment extends between the intersection of the axis of the first light guide with the position of the limiting ray of the second light guide and the intersection of the axis of the second light guide with the position of the limiting ray of the first light guide.

In this way, as more fully explained hereinafter, rays arriving axially through the first guide pass at the critical angle into the second guide whereas those issuing at the critical angle from the first guide are axially introduced into the second guide; if the guides are of equal length, the two rays will undergo approximately the same number of internal reflections along the combined path. Intermediate rays, exiting and re-entering at less than the critical angle, experience a combined number of reflections in the two guides which establishes for them a transit time close to that of the axial and limiting rays referred to.

It should be understood that the light rays passing through a system according to our invention need not necessarily lie in the visible spectrum. Naturally, two or more equalizers according to our invention may be used between successive cascaded light guides representing respective sections of a transmision path.

According to another feature of our invention, the confronting ends of the cascaded light guides and the associated mirror or mirrors are embedded in a body of transparent material whose index of refraction substantially equals that of the light guides, thereby eliminating or minimizing further refractions at the fiber ends. Naturally, the mirror or mirrors should have a different refractive index.

BRIEF DESCRIPTION OF THE DRAWING

The above and other features of our invention will now be described in detail with reference to the accompanying drawing in which.

SPECIFIC DESCRIPTION

Figure 1:
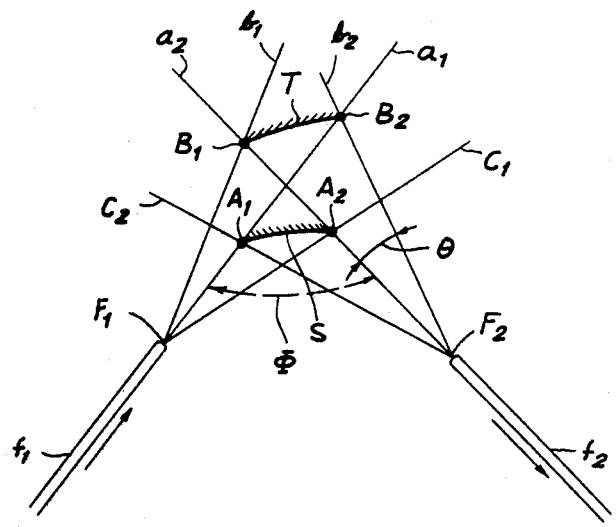
FIG. 1 is a somewhat diagrammatic view of confronting extremities of a pair of cascaded light guides and two associated mirrors according to our invention.

In FIG. 1 we have illustrated parts of two light guides $f_1$, $f_2$, guide $f_1$ conducting luminous radiation from a nonillustrated source toward light guide $f_2$ for transmission to a load also not shown. Guide $f_1$ has an exit end whose central point $F_1$ is considered the origin of three rays $a_1$, $b_1$, $c_1$ issuing from that guide, ray $a_1$ being axially oriented and including with the other two rays a critical angle $\theta$ determined by the refractive index of the guide; it is assumed that this index is the same for both light guides $f_1$ and $f_2$. Analogously, guide $f_2$ has an entrance end whose central point $F_2$ collects a bundle of rays, among them an axial ray $a_2$ and two marginal rays $b_2$, $c_2$ including the critical angle $\theta$ with ray $a_2$. The two guide axes, and therefore rays $a_1$ and $a_2$, include with each other an angle $\Phi$ which is independent of $\theta$ and is here shown to be about $\pi/2$.

The paths of rays $a_1$ and $c_2$, lying in a common axial plane of the guides, intersect in a point $A_1$; another point $A_2$ represents the intersection of rays $c_1$ and $a_2$ also lying in that axial plane. Points $A_1$ and $A_2$ lie at the ends of a mirror S which is curved within that plane along a segment of an ellipse having its focal points at $F_1$ and $F_2$. Thus, light exiting axially from guide $f_1$, following the path of ray $a_1$, is reflected by mirror S along the path of ray $c_2$ to enger the guide $f_2$ at the critical angle $\theta$. Conversely, light exiting from guide $f_1$ at the critical angle, following the path of ray $c_1$, is reflected by mirror S along the path of axial ray $a_2$ toward the guide $f_2$. If the two guides are of the same length, the transit time of the ray path $a_1 + c_2$ will substantially equal the transit time of the ray path $c_1 + a_2$. The transit time for intermediate rays (not shown), striking the mirror S between points $A_1$ and $A_2$, will also be approximately the same.

As further shown in FIG. 1, another mirror T has an end $B_1$ at the intersection of the paths of rays $b_1$ and $a_2$ and an end $B_2$ at the intersection of the paths of rays $a_1$ and $b_2$. In this instance, too, luminous energy following the ray paths $b_1 + a_2$ and $a_1 + b_2$ will have practically the same transit time and will therefore experience virtually identical phase shifts; again, the intermediate rays will have transit times and phase shifts of approximately the same magnitude.

As will be readily apparent from FIG. 1, the path length of the rays reflected by mirror S will differ from that of the rays reflected by mirror T. Thus, the use of both mirrors together does not fully eliminate the phase difference among the various rays traveling from the source to the load. To improve the aforementioned corrective factor in comparison with the known equalization systems referred to, only one mirror — preferably the inner mirror S — should be used. On the other hand, the simultaneous utilization of both mirrors is indicated where a minimum loss of radiant energy is the paramount consideration. By selectively blocking and unblocking the passage of light to or from one of the two mirrors we can, accordingly, adapt the system to different operational requirements.

Figure 2:
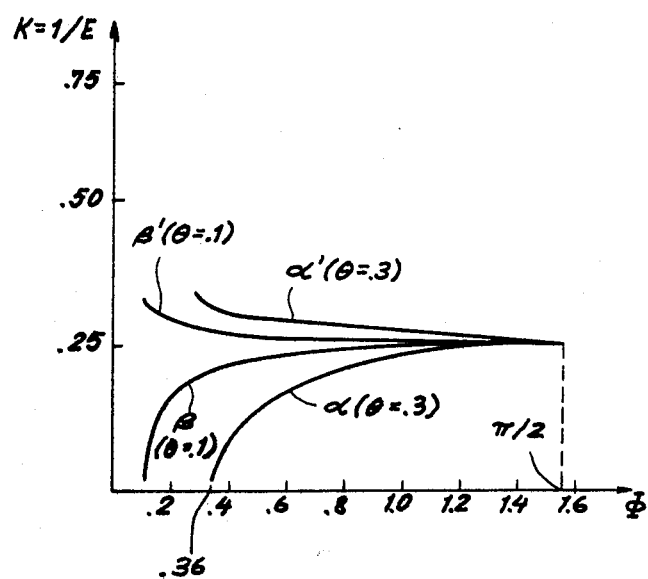
FIG. 2 is a set of graphs relating to the operation of the system of FIG. 1.

It will further be evident that intersections $A_1$ and $A_2$ will vanish when the angle $\Phi$ approaches the value $\pi - \theta$, thereby eliminating the possibility of utilizing the mirror S; conversely, when that angle $\Phi$ is reduced to approximately the value of $\theta$, the intersections $B_1$ and $B_2$ disappear so that it will not be possible to employ the mirror T. Midway within that range, i.e. for $\Phi = \pi/2$, the corrective factor has the same value $E' = 4$ as in the conventional refractive equalizers; this applies to the use of either mirror S, T. In FIG. 2 we have potted the reciprocal $K = 1/E$ of this factor, i.e. the width ratio between a corrected and an uncorrected pulse, against the axial angle $\Phi$. Curves $\alpha$ and $\beta$ in FIG. 2 relate to the use of mirror S alone, curve $\alpha$ representing a critical angle $\theta = 0.3$ rad. whereas curve $\beta$ is for $\theta = 0.1$ rad. Curves $\alpha'$ and $\beta'$ represent the corresponding values of $\theta$ with the sole use of mirror T. Since a reduction of $\theta$ increases the distance between points $A_1$, $A_2$, on the one hand, and points $B_1$, $B_2$, on the other hand, the corrective factor E decreases if the two mirrors are employed conjointly. In the lower part of the range, the use of mirror S alone results in a sharp rise of factor E to a value of about 50 for $\Phi \approx \theta$; in the nonillustrated upper part of the range, curves $\alpha$, $\beta$ are substantially the mirror images of the illustrated portions of curves $\alpha'$, $\beta'$, and vice versa.

Since the compensation of phase differences by an equalizer according to our invention applies only to straight light guides $f_1$, $f_2$, the transmission of signals between a point of origin and a point of destination can occur only over a zig-zag path with two or more angularly adjoining guide segments. Thus, a reduction of axial angle $\theta$ necessitates either a lengthening of the segments or an increase in the number of such segments and therefore also in the number of equalizers. For this reason, there are practical limits for the minimum value of $\theta$.

Figure 3:
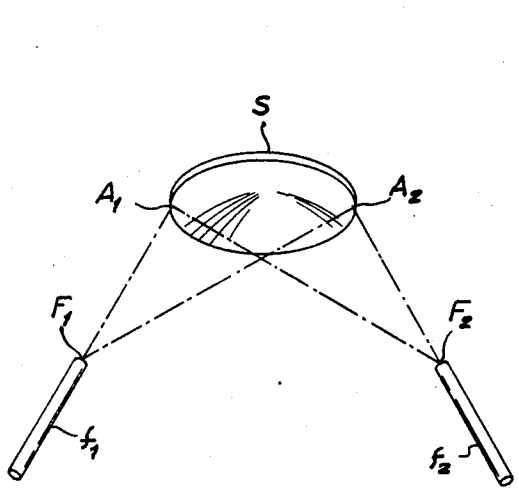
FIG. 3 is a perspective view of the extremities of the two light guides of FIG. 1, here shown as fibers, together with one of the associated mirrors.
Figure 4:
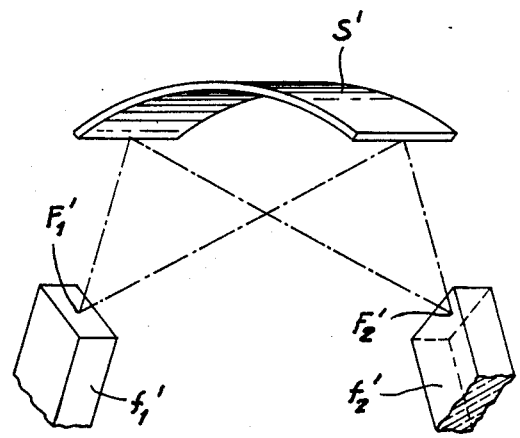
FIG. 4 is a perspective view generally similar to FIG. 3 but showing the light guides in the form of foils with a modified mirror.

The guides $f_1$ and $f_2$ of FIG. 1 could be individual fibers, as more clearly shown in FIG. 3, yet the principles just described also apply to flat guides $f_1'$ and $f_2'$ as shown in FIG. 4, i.e. ribbons or foils. In the first instance, the reflecting surfaces of mirrors S and T may be part of ellipsoids of revolution as illustrated for mirror S in FIG. 3. In the second instance, the mirror surfaces may be segments of elliptical cylinders with generatric parallel to the minor sides of the guide sections, as shown at S' in FIG. 4; central points $F_1$ and $F_2$ of FIG. 1 then represent short transverse lines (designated $F_1'$ and $F_2'$ in F16-4) which direct the ends of guides $f_1'$ amd $f_2'$.

An ellipsoidal mirror as shown in FIG. 3 may be replaced by two (or more) cylindrically curved mirrors, similar to mirror S of FIG. 4, inclined toward one another to intercept rays deviating from the axial plane of the guides.

Figure 5:
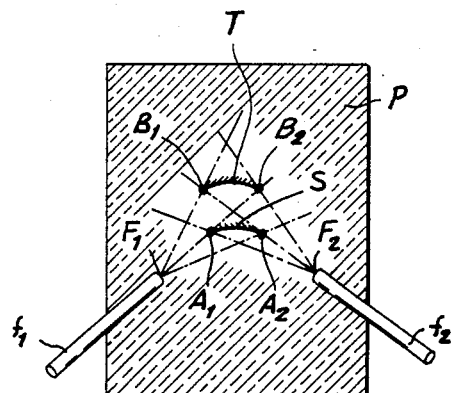
FIG. 5 is a view similar to FIG. 1, showing the elements of the system encased in a transparent body.
Figure 6:
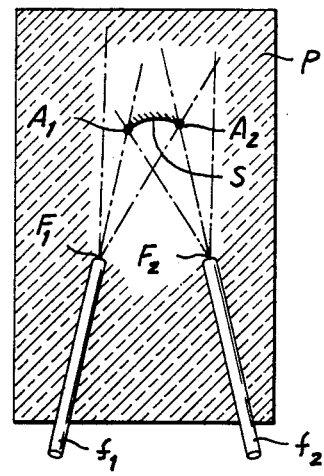
FIG. 6 illustrates a modification of the system of FIG. 5 with a change in the relative inclination of the two light guides and with omission of one of the mirrors.

In FIGS. 5 and 6 we have shown the light guides $f_1$ and $f_2$ of FIG. 1 embedded, together with mirrors S and T, in a body P of transparent material whose refractive index is the same as that of the guides. FIG. 5 shows a relatively large angle $\Phi > \pi/2$, with two mirrors S and T, whereas FIG. 6 illustrates a small angle $\Phi \approx 20$, with only one mirror S. Naturally, flat light guides $f_1'$ and $f_2'$ of FIG. 4 can be similarly encased. If body P consists not of a solid but of a refractive fluid, its presence will not interfere with changes in the acial angle $\Phi$ and in the position of the mirror or mirrors.

An equalizer consisting of one or two mirrors, pursuant to our invention, constitutes much less of an encumbrance for an optical signaling system of the type here described than does an array of lenses or other refractive components.

We claim:

1. A system for the optical transmission of signals, comprising:
   a first and a second light guide with internally reflecting boundaries respectively connected to a transmitter and a receiver of luminous signals, said light guides having proximal ends respectively emitting and collecting bundles of light rays with axes angularly intersecting in a common plane, each bundle being bounded by a pair of limiting rays on opposite sides of the respective axis; and
   a mirror confronting said proximal ends for reflecting light rays from said first light guide to said second light guide, said mirror having a cross-section in said common plane in the shape of a segment of an ellipse whose foci are the center points of said proximal ends within said common plane, said segment extending between the intersection of the axis of said first light guide with the position of a limiting ray of said second light guide and the intersection of the axis of said second light guide with the position of a limiting ray of said first light guide.

2. A system as defined in claim 1, further comprising a body of transparent material having substantially the same index of refraction as said light guides, said proximal ends and said mirror being embedded in said body.

3. A system as defined in claim 1, comprising another mirror confronting said proximal ends for reflecting light rays from said first light guide to said second light guide, said other mirror having a cross-section in said common plane in the shape of a segment of an ellipse whose foci are said center points and which extends between the intersection of the axis of said first light guide with the position of the other limiting ray of said second light guide and the intersection of the axis of said second light guide with the position of the other limiting ray of said first light guide.

4. A system as defined in claim 1 wherein said light guides are two individual fibers, the reflecting surface of said mirror being a segment of an ellipsoid of revolution.

5. A system as defined in claim 1 wherein said light guides have a width transverse to said common plane less than their width in said common plane, the reflecting surface of said mirror being a segment of an elliptical cylinder with generatrices perpendicular to said common plane.

* * * * *